(12) United States Patent
Cozzetti (10) Patent No.: US 12,069,027 B2
(45) Date of Patent: Aug. 20, 2024

(54) SECURING INTRA-VEHICLE COMMUNICATIONS VIA A CONTROLLER AREA NETWORK BUS SYSTEM BASED ON BEHAVIORAL STATISTICAL ANALYSIS

(71) Applicant: Fortinet, Inc., Sunnyvale, CA (US)

(72) Inventor: H. Agustin Cozzetti, Vallauris (FR)

(73) Assignee: Fortinet, Inc., Sunnyvale, CA (US)

( * ) Notice: Subject to any disclaimer, the term of this patent is extended or adjusted under 35 U.S.C. 154(b) by 1099 days.

(21) Appl. No.: 16/361,521

(22) Filed: Mar. 22, 2019

(65) Prior Publication Data

US 2020/0304467 A1    Sep. 24, 2020

(51) Int. Cl.
*H04L 29/06* (2006.01)
*H04L 9/40* (2022.01)
*H04L 12/40* (2006.01)
*B60R 16/023* (2006.01)

(52) U.S. Cl.
CPC .......... *H04L 63/0245* (2013.01); *H04L 12/40* (2013.01); *B60R 16/0231* (2013.01); *H04L 2012/40215* (2013.01); *H04L 2012/40273* (2013.01)

(58) Field of Classification Search
CPC . H04L 63/1416; H04L 63/1425; H04L 12/28; H04L 63/0245; H04L 12/40
See application file for complete search history.

(56) References Cited

U.S. PATENT DOCUMENTS

| | | | |
|---|---|---|---|
| 2016/0205194 A1* | 7/2016 | Kishikawa | H04L 63/10 726/1 |
| 2016/0294855 A1* | 10/2016 | Maeda | H04L 63/1416 |
| 2016/0381068 A1* | 12/2016 | Galula | G07C 5/0816 726/23 |
| 2019/0036946 A1* | 1/2019 | Ruvio | H04W 4/44 |

OTHER PUBLICATIONS

Natale, Marco Di. "Understanding and using the Controller Area Network." Oct. 30, 2018. 47 pgs.

* cited by examiner

*Primary Examiner* — Jeffrey C Pwu
*Assistant Examiner* — Thong P Truong
(74) *Attorney, Agent, or Firm* — Law Office of Dorian Cartwright; Dorian Cartwright (57) ABSTRACT

Systems and methods for enforcement of secure data communications between nodes of a Controller Area Network (CAN) bus implemented in a vehicle are provided. According to one embodiment, a node coupled with the CAN bus receives a data frame broadcast from a source node and extracts information from the data frame. The node analyzes coherence between the extracted information and historical information observed by the node. When a result of the analyzing coherence indicates that the data frame is valid (i.e., the extracted information is coherent with the historical information), the node updates the historical information based on the data frame; otherwise the node drops the data frame to discontinue processing of the data frame.

14 Claims, 9 Drawing Sheets

SECURING INTRA-VEHICLE COMMUNICATIONS VIA A CONTROLLER AREA NETWORK BUS SYSTEM BASED ON BEHAVIORAL STATISTICAL ANALYSIS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright ©2019, Fortinet, Inc.

BACKGROUND

Field

Embodiments of the present invention generally relate to network security. In particular, embodiments of the present invention relate to an improved security approach that provides protection against malicious, fake or misleading communications (data frames), for example, from being processed by nodes (devices) connected to a Controller Area Network (CAN) bus system by performing statistical analysis on the communications and when the CAN bus system is implemented within a connected car, also taking into consideration the current status of the environment of the connected car.

Description of the Related Art

With rapid growth in technology there has been an exponential increase in safety, driver assistance, and infotainment devices in modern vehicles, including connected cars, which make use of a number of control units and electronic devices to continuously exchange heterogeneous information. Exchange of data within the electronic devices of the vehicle for implementing vehicular applications is referred to as intra-vehicular communication. The Controller Area Network (CAN) protocol was originally developed by Robert Bosch GmbH and was documented by Bosch in several versions of the CAN specification, the latest version of which is CAN 2.0 published in 1991 (the "Bosch CAN specification 2.0"), which is hereby incorporated by reference herein for all purposes. The International Organization for Standardization (ISO) subsequently released the CAN standard ISO 11898 in multiple parts (e.g., ISO 11898-1, ISO 11898-2 and ISO 11898-3), which are available for purchase from the ISO.

The CAN bus facilitates communications among various electronic devices. Non-limiting examples of the electronic devices that may be coupled to a CAN bus system included engine management systems, active suspension, Automatic Braking Systems (ABS), parking assisting systems, gear control, lighting control, air conditioning, airbags, central locking, vehicle infotainment systems, sensors, radar, antennas and the like embedded in or otherwise implemented within an automobile or a vehicle. CAN is based on a two wired half duplex high speed serial network technology for communication to enable wide range of safety, economy and convenience features in vehicles, including, but not limited to, auto start/stop, electric parking brakes, parking assist systems, auto lane assist, collision avoidance systems and the like. Advantageously, CAN based multiplex wiring communication enables distributed control of the various connected devices (also referred to by the CAN specifications as "nodes"), ensures noise free transmission, and also reduces the need for a large amount of wiring.

One limitation of CAN, however, is that it is a low-level protocol that does not intrinsically support security features, thereby raising substantial concerns in terms of secured communications. Due to the nature of intra-vehicular communications via CAN and other constraints associated with CAN, typical security approaches cannot be effectively introduced and applied. Moreover, standard CAN implementations do not implement encryption, which leaves CAN networks open to man-in-the-middle attacks. While encryption might be used as a potential cyber security mechanism for providing confidentiality and integrity of communications between different devices connected to a vehicle's CAN bus system, unfortunately, symmetric/asymmetric cryptography or certificates cannot provide security in several cases, such as, for example, when a node of the CAN bus system is compromised. In such cases, whether or not the data frames are encrypted, data reliability is not guaranteed.

Therefore, there is a need for a more effective security mechanism that provides protection of data frames exchanged via CAN sufficient to ensure the reliability of what is being communicated by such data frames.

SUMMARY

Systems and methods are described for enforcement of secure data communications between nodes of a Controller Area Network (CAN) bus implemented in a vehicle. According to an embodiment, a receiving node of multiple nodes coupled with a CAN bus of a connected car receives a data frame broadcast from a source node of the multiple nodes. On receiving the data frame, the receiving node makes a first determination regarding whether the receiving node is the intended recipient of the data frame such that if the first determination is affirmative (i.e., if the receiving node is the intended recipient of the data frame), the receiving node makes a second determination regarding whether an internal firewall node of the multiple nodes has identified the data frame as a potentially malicious data frame. When second determination is affirmative (i.e., when the internal firewall node has identified the data frame as potentially malicious data frame), the receiving node drops the data frame and discontinues processing of the data frame. On contrary, when the first determination is negative (i.e., when the receiving node is not the intended recipient of the data frame, or when the second determination is negative (i.e., when the internal firewall node has not identified the data frame as potentially malicious data frame)), the receiving node extracts information from the data frame and analyzes coherence between the extracted information and historical information observed by the receiving node. When result of the analyzing coherence indicates that the data frame is valid, the receiving node updates the historical information based on the data frame, otherwise the receiving node discards the data frame.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for enforcement of secure data communications between nodes of a Controller Area Network (CAN) bus implemented in a vehicle. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The phrase "connected car" generally refers to a vehicle having one or more driving automation systems, including, but not limited to, those supporting any of the six levels of driver assistance technology specified by the Society of Automotive Engineers (SAE) International. Such vehicles are currently referred to by numerous terms, including self-driving cars, computer-controlled cars, autonomous vehicles, driverless cars and the like. While outside the scope of the present disclosure, connected cars typically rely on wireless mobile communications (e.g., defined by standards, like IEEE 802.11p and IEEE 1609) to exchange data in order to make decisions concerning dangerous situations for the drivers or for path optimization.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, anti-spam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

According to various embodiments of the present disclosure, one or more processors associated with a node of multiple nodes coupled with a CAN bus of a connected car provides enforcement of secure data communications between nodes of the CAN bus. The one or more processors node may be associated with each receiving node or an internal firewall node and may receive a data frame broadcast from a source node of the multiple nodes. Further, information from the data frame is extracted to analyze coherence between the extracted information and historical information pertaining to any or a combination of status of the can bus and status of the source device. On analyzing the extracted information, when the data frame is found valid the historical information based on the data frame is updated otherwise the data frame is discarded such that the data frame is not processed further.

According to an aspect of the present disclosure, a receiving node of multiple nodes coupled with a CAN bus of a connected car receives a data frame broadcast from a source node of the multiple nodes. On receiving the data frame, the receiving node makes a first determination regarding whether the receiving node is the intended recipient of the data frame such that if the first determination is affirmative, i.e., if the receiving node is the intended recipient of the data frame, the receiving node makes a second determination regarding whether an internal firewall node of the multiple nodes has identified the data frame as a potentially malicious data frame. When second determination is affirmative, i.e. when the internal firewall node has identified the data frame as potentially malicious data frame, the receiving node drops the data frame and discontinues processing of the data frame. On contrary, when the first determination is negative, i.e. when the receiving node is not the intended recipient of the data frame, or when the second determination is negative, i.e., when the internal firewall node has not identified the data frame as potentially malicious data frame, the receiving node extracts information from the data frame and analyzes coherence between the extracted information and historical information observed by the receiving node. When result of the analyzing coherence indicates that the data frame is valid, the receiving node updates the historical information based on the data frame, otherwise the receiving node discards the data frame.

Figure 1A:
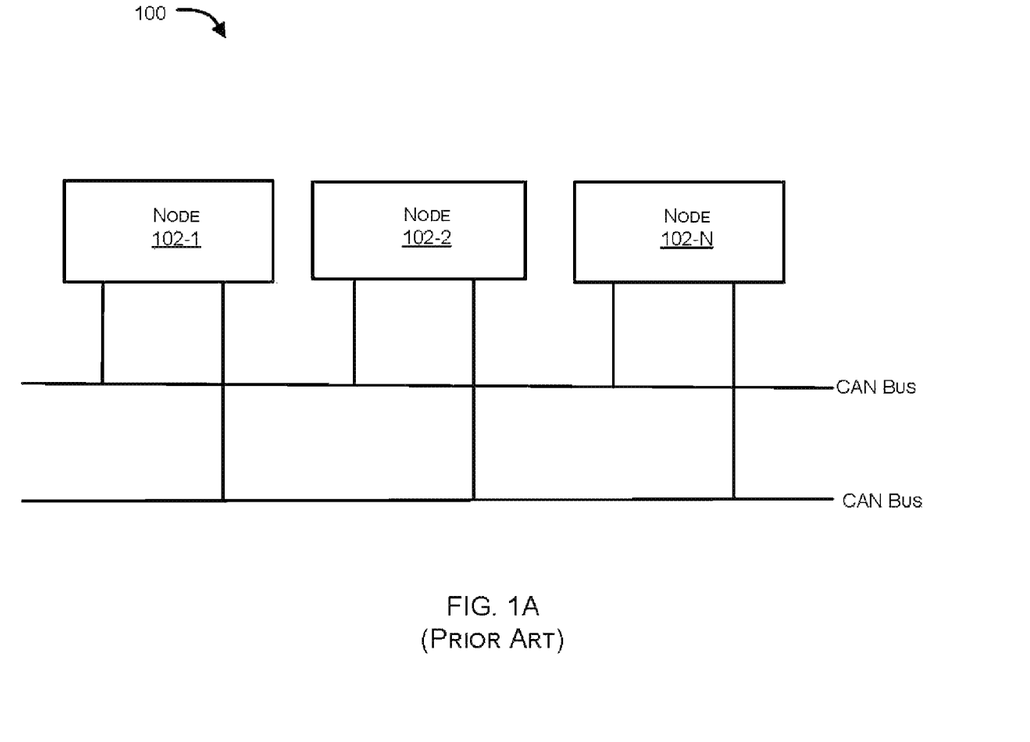
FIG. 1A illustrates a generalized view of a prior art CAN bus architecture for enabling communications between various electronic devices of a vehicle.

FIG. 1A illustrates a generalized view of a prior art CAN bus architecture 100 for enabling communications between various electronic devices of a vehicle. According to prior art architecture 100, multiple devices or "nodes" 102-1, 102-2 . . . 102-N (which may be individually referred to as node 102 and may be collectively referred to as nodes 102, hereinafter) are connected to a two wire CAN bus implemented in a vehicle, such as a connected car. Nodes 102 can be electronic devices that enables vehicular applications in the connected car, for example, the electronic devices related to engine management systems, active suspension, Automatic Braking Systems (ABS), parking assisting systems, gear control, lighting control, air conditioning, airbags, central locking, vehicle infotainment systems, sensors, radar, antennas and the like. Architecture 100 provides interconnection among various nodes 102 such that a source node of nodes 102 broadcasts a data frame, which is received by other nodes (referred to as receiving nodes, hereinafter) of nodes 102. Because of the broadcast nature of the CAN protocol, each receiving node typically follows a filtering process so as to ignore broadcast data frames for which it is not the intended recipient and take action only those of the broadcast data frames for which it is the intended recipient. For example, nodes can define one or more message filters and/or one or more reception masks to specify the messages they are interested in receiving. When the identifier of the broadcast data frame does not meet the specified conditions, the broadcast data frame can be dropped as illustrated below in connection with FIG. 1B.

Figure 1B:
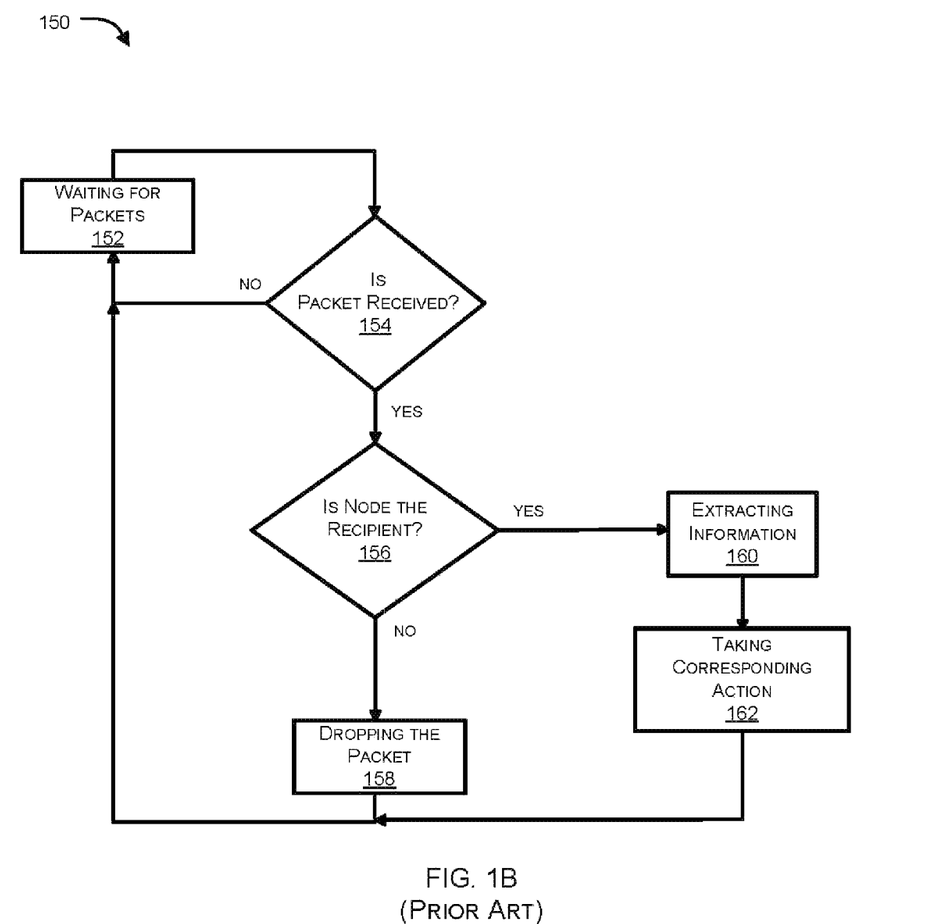
FIG. 1B is a simplified block diagram conceptually illustrating a prior art technique for processing communications between various electronic devices of a vehicle connected to each other via a CAN bus system.

FIG. 1B is a simplified block diagram 150 conceptually illustrating a prior art technique for processing communications between various electronic devices of a vehicle connected to each other via a CAN bus system. In context of the present example, at block 152, the receiving node waits for data frames (interchangeably referred to herein as data packets or messages) and at block 154, the receiving node continuously checks whether a data frame has been received. When a data frame has been received, at block 156, the receiving node determines whether the receiving node is the intended recipient of the data frame from the source node. As noted above, in one embodiment, nodes define one or more message filters and/or one or more reception masks to specify the messages they are interested in receiving. When the identifier of the broadcast data frame meets the specified conditions, the receiving node considers itself an intended recipient of the broadcast data frame. Notably, this means multiple nodes on the CAN bus can be intended recipients of one or more types of data frames or no nodes on the CAN bus may consider themselves as an intended recipient of one or more types of data frames.

If the receiving node is the intended recipient of the data frame, at block 160, the receiving node extracts information from the data frame and at block 162, the receiving nodes takes an action corresponding to the extracted information. Conversely, if the receiving node is not the intended recipient of the data frame, at block 158, the receiving node drops the data frame such that the data frame is not processed further. In either case, the process continues with block 152 by waiting for more data frames.

Figure 2A:
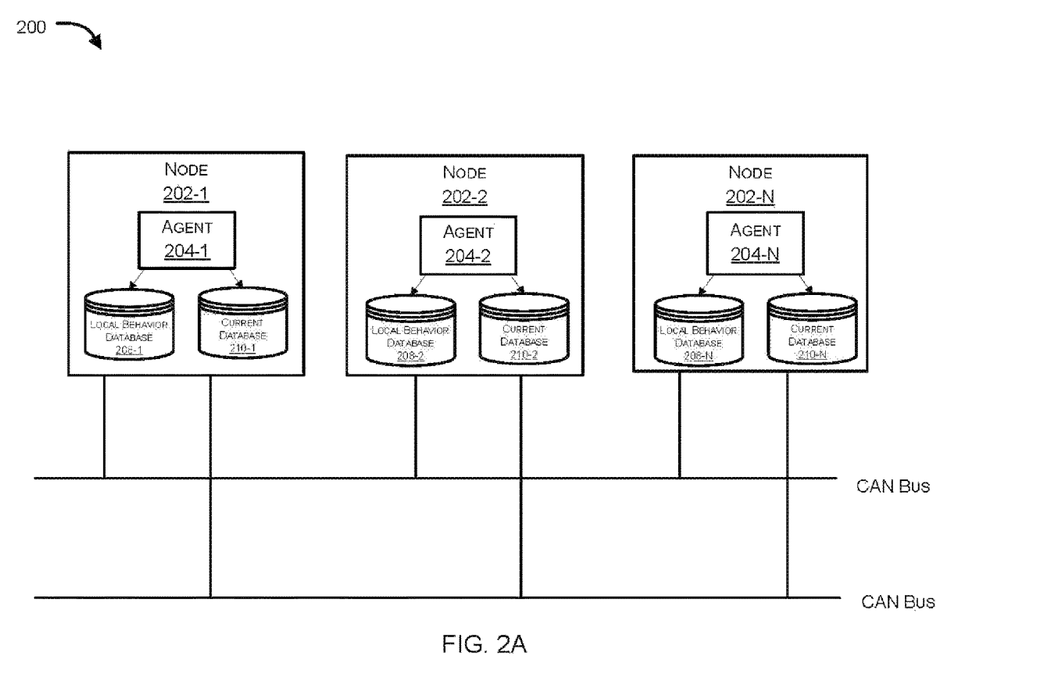
FIG. 2A illustrates an improved CAN bus architecture in accordance with an embodiment of the present invention.
Figure 2B:
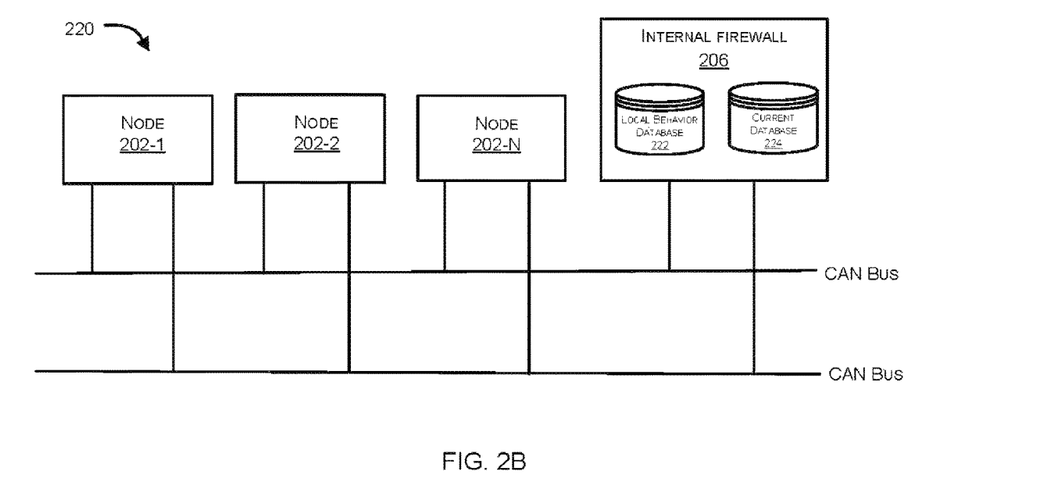
FIG. 2B illustrates an improved CAN bus architecture in accordance with an alternative embodiment of the present invention.
Figure 2C:
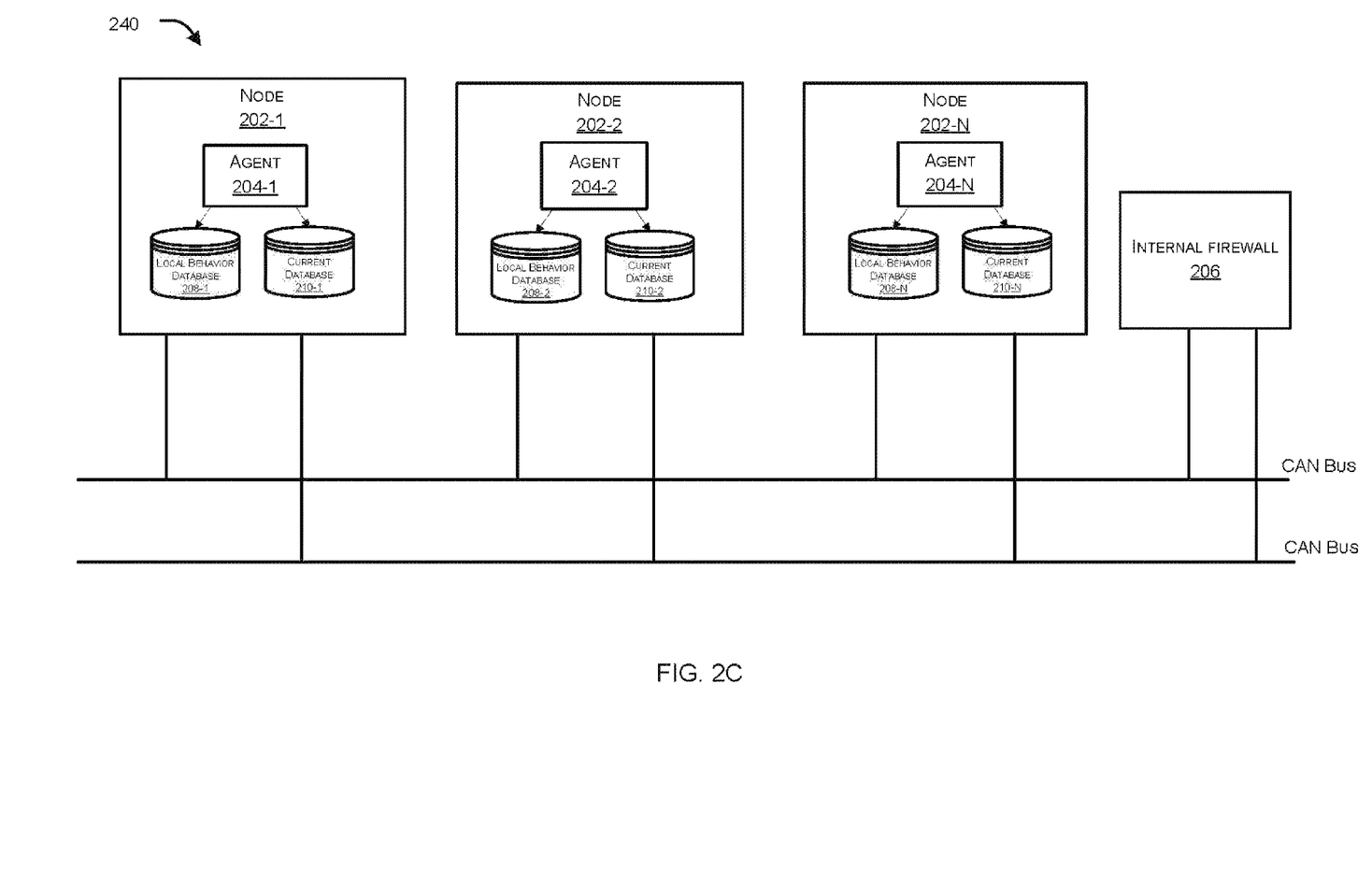
FIG. 2C illustrates an improved CAN bus architecture in accordance with yet another alternative embodiment of the present invention.

FIG. 2A illustrates an improved CAN bus architecture 200 in accordance with an embodiment of the present invention. FIG. 2B illustrates an improved CAN bus architecture 220 in accordance with an alternative embodiment of the present invention. FIG. 2C illustrates an improved CAN bus architecture 240 in accordance with yet another alternative embodiment of the present invention.

According to various embodiments of the present disclosure, a security approach for communication in a CAN bus system can be implemented using any or a combination of agents 204-1, 204-2 . . . 204-N (which may be individually referred to as agent 204 and may be collectively referred to as agent 204, hereinafter) configured in connected nodes 202-1, 202-1 . . . 202-N (which may be individually referred to as node 202 and may be collectively referred to as nodes 202, hereinafter) and an internal firewall 206. According to an embodiment, architecture 200 implements the security approach using agents 204 alone. According to another embodiment, architecture 220 implements the security approach using internal firewall 206 alone. According to yet another embodiment, architecture 240 implements the security approach using both agents 204 and internal firewall 206.

According to various embodiments of the present disclosure, in order to provide security in a CAN based network, behavioral statistics analysis is performed on data frames related to communications between nodes 202 connected through the CAN bus. Information observed regarding data frames broadcast on the CAN bus, including, for example, the data being transmitted, the data rate, the type of frame, the destination of the data, the data format, the contents of the data frame, etc. is analyzed for coherence with the current situation of the connected car and expected input/output of the node 202 that originated the data frame. The analysis is performed in real-time by taking into account the current status of the connected car and its surroundings as informed by neighboring connected cars, for example.

Referring to architectures 200 and 240, according to an embodiment, each agent 204 configured in node 202 connected to a CAN bus system of a connected car maintains two different databases. One containing historical information over time representing a sequence of communications observed by node 202 for a predetermined or configurable time period, which is referred to as a local behavior database 208; and another containing historical information over time containing trusted information representing a current status of an environment in which the connected car is operating, which is referred to as a current database 210, including information identifying (e.g., networking addresses) of the neighboring vehicles in proximity to the connected car with which the connected car has received a communication within a predetermined or configurable amount of time (e.g., 10 to 15 minutes or more, depending, for example, upon the storage constraints of the vehicle communication subsystem), information regarding a status of a road on which the connected car is driving and status information associated with the neighboring vehicles in proximity to the connected car. The status of a road on which the connected car is driving may be ascertained, for example, by extracting such information from event information packets/messages (e.g., DENMs) received from the neighboring vehicles. The status information associated with the neighboring vehicles may be ascertained, for example, by extracting such information from vehicle information packets/messages (e.g., CAMs) received from the neighboring vehicles. In one embodiment, both local behavior database 208 and current database 210 are sliding window databases, operating in a manner similar to a circular buffer. That is, the databases 208 and 210 may be capped at a predetermined size (reflecting the amount of data expected to be stored during the predetermined or configurable amount of time) and the oldest data stored in the databases is overwritten thereafter. In another embodiment, entries in the databases may be time-stamped and may be expunged upon the predetermined or configurable amount of time after the timestamp.

According to an embodiment, the security approach is implemented by analyzing coherence between information extracted from a data frame received by node 202 and historical information observed by node 202. The historical information can include a current status of an environment in which the connected car is operating based on current database 210 and a status of the source node using local behavior database 208.

According to an architectures 200 and 240, when an node 202 receives a data frame broadcast from a source node, agent 202 analyses information extracted from the data frame even if node 202 is not an intended recipient of the data frame. The extracted information is stored in a local database that maintains the "current view" of the vehicle, which allows, among other things, recognizing the current state of a road on which the connected car is driving, the current state of neighboring vehicles in proximity to the connected car, the current status of the CAN network and nodes 202. Each agent 204 maintains their own local behavior database 208 and current database 210, which are not shared or accessible by other nodes, to predict in advance future actions of each node 202 through statistical analysis. When one node 202 is compromised, as soon as compromised node 202 sends information that does not match the expected behavior, the information can be discarded and not acted upon. In case of uncertain situations, a more accurate analysis can be requested from an external device (e.g., a cloud or central intelligence unit) through LTE communications, for example. Additionally, when a suspicious communication from a node 202 is detected, a full scan on that node 202 can be triggered. The full scan can be performed internally or by the external source.

According to an embodiment, a priority for different data frames defined in the CAN standard (e.g., based on their message IDs) provides transmission priority on the CAN bus. So, in theory, higher priority data frames transmitted at about the same time as lower priority data frames should be received by nodes before the lower priority data frames. The nodes may also be configured to process higher priority data frames in their respective receive queues prior to processing lower priority data frames, thereby provide more weight to a data frame received from internal firewall node 206 than from other nodes 202. Thus, statistical analysis becomes more accurate and it becomes possible to block processing of data frames in case of a cyberattack. When a malicious data frame is detected, internal firewall node 206 can broadcast a high priority data frame as a warning to the other nodes regarding the malicious data frame. Assuming the receiving nodes process the high priority data frame before the malicious data frame, agents 204 can drop the malicious data frame, thereby preventing attacks when agents 204 are not able to correctly detect malicious data frames locally. Therefore, in accordance with architecture 240, a local analysis is performed by agents 204 that received the data frame, and an additional analysis is performed in parallel by internal firewall node 206. Internal firewall node 206 can receive data frames from all nodes 202 and therefore, can be always aware about status of the connected car and each node 202. A detailed explanation of an exemplary process followed with respect to architectures 200 and 240 is described further below with reference to FIGS. 4A-B.

Referring now to architecture 220, a local behavior database 222 and a current database 224 similar to databases 208 and 210, respectively, can be maintained by internal firewall node 206 such that internal firewall node 206 receives a data frame broadcast from a source connected with CAN and extracts information from the data frame to analyze coherence between the extracted information and historical information observed by the internal firewall node using local behavior database 222 and current database 224. The historical information can include a current status of an environment in which the connected car is operating based on current database 224 and a status of the source node using a local behavior database 222. A detailed explanation of an exemplary process followed with respect to architecture 220 is described further below with reference to FIG. 5.

Figure 3:
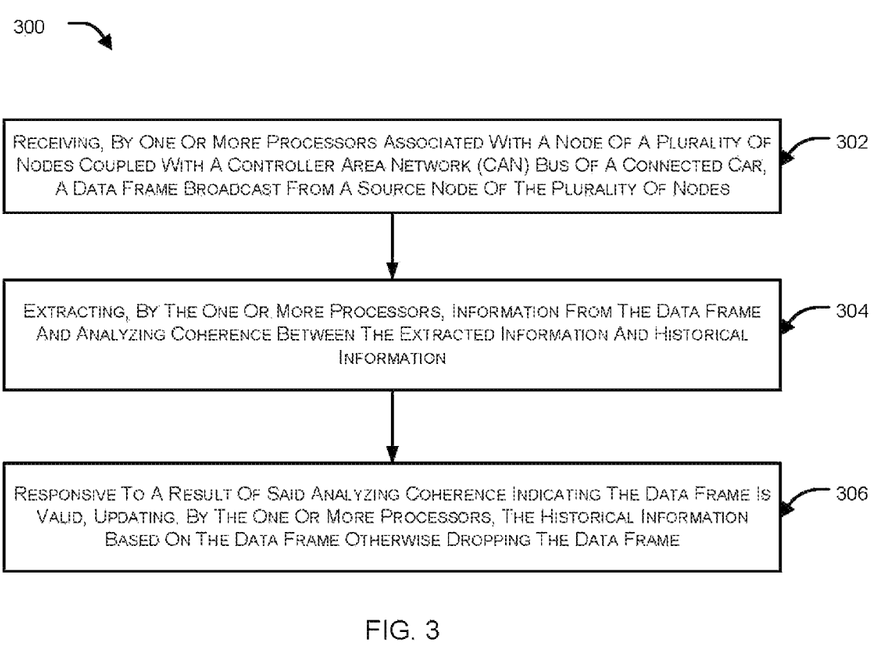
FIG. 3 is a high-level flow diagram illustrating a secure communication process in accordance with an embodiment of the present invention.

FIG. 3 is a high-level flow diagram 300 illustrating a secure communication process in accordance with an embodiment of the present invention. In context of the present example, at block 302, a node of the multiple nodes coupled with a CAN bus of a connected car receives a data frame broadcast from a source node of the multiple nodes. At block 304, the node extracts information from the data frame and analyzes a degree of coherence between the extracted information and historical information which can include a current status of an environment in which the connected car is operating and a status of the source node.

In an example, the current status of an environment in which the connected car is operating can include information related to number of other connected cars in proximity, road conditions, status of the other connected cars in proximity, and the like, which can be reflected by a current database. In an example, the status of the source node can include information related to state of the node within a chain of events (e.g., in the form of a state machine) or sequence of messages exchange by the node and corresponding expected behavior of the node, which can be reflected by the local behavior database. The expected behavior of the node may be determined based on conditions such as whether the source node is operating consistently, in terms, of data transmitted, data rate, type of packet, destination of the data, data format, contents, etc., with reference to a data communication specification associated with the source node, for example.

At block 306, in response to a result of the coherence analysis indicating that the data frame is valid (i.e., when the extracted information is determined to be sufficiently coherent with the historical information), the node updates historical information based on the data frame; otherwise, the node drops the data frame and discontinues further processing.

In view of the broadcast nature of the CAN bus system, those skilled in the art will appreciate that the node in the context of flow diagram 300 can be any device (referred to as a receiving node) coupled with the CAN bus and typically represents an electronic device that enables one or more vehicular applications. In embodiments of the present invention, the receiving node can also be a separate internal firewall node that enforces security on the CAN bus by performing an independent data frame validation process. An exemplary data frame validation process implemented by receiving nodes is explained in detail below with reference to FIGS. 4A-B and another exemplary data frame validation process that may be implemented by the internal firewall node is explained in detail with reference to FIG. 5.

Figure 4A:
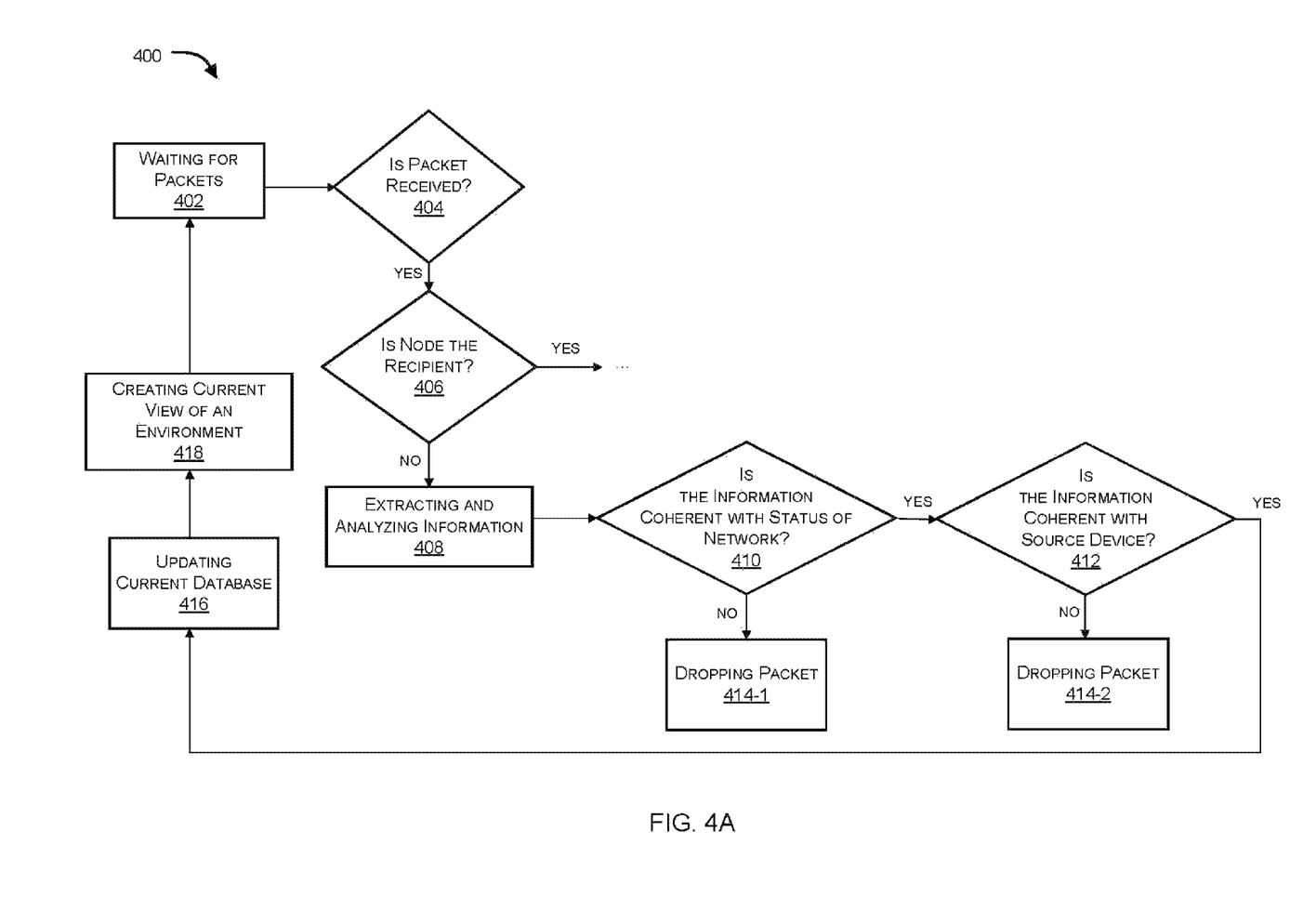
FIG. 4A is a flow diagram illustrating data frame validation processing implemented by a node that is not an intended (interested) recipient of the type of data frame at issue in accordance with an embodiment of the present invention.

FIG. 4A is a flow diagram 400 illustrating data frame validation processing implemented by a node that is not an intended (interested) recipient of the type of data frame at issue in accordance with an embodiment of the present invention.

In context of the present example, at block 402, each receiving node of the multiple nodes coupled with a CAN bus of a connected car, waits for a data frame broadcast from a source node of the multiple nodes and at block 404, the receiving node determines whether a data frame has been received. When the receiving node receives a data frame broadcast from the source node, at block 406, the receiving node makes a first determination regarding whether the receiving node is the intended recipient of the data frame. When the first determination is negative, (i.e. when the receiving node is not the intended recipient of the data frame based on local application of one or more message filters and/or one or more reception masks, for example), at block 408 the receiving node extracts information from the data frame. Further, at blocks 410 and 412, the receiving node analyzes the coherence between the extracted information and historical information observed by the receiving node. Notably, the coherence may be a binary decision (e.g., coherent or not) or may be a degree or measure of coherence (e.g., ranging from 0% to 100% coherence) depending upon the extracted information being analyzed.

In an embodiment, analyzing coherence includes, at block 410 analyzing coherence between the extracted information and a current status of an environment in which the connected car is operating based on a current database and, at block 412 analyzing coherence between the extracted information and a status of the source node, using local behavior database. The current database may include historical information regarding one or more of neighboring vehicles in proximity to the connected car, a status of a road on which the connected car is driving and respective status associated with the neighboring vehicles. Further, the local behavior database may include historical information regarding a sequence of communications observed by the receiving node. The status of the source node may be determined based on any or a combination of the historical information regarding the sequence of communications and a data communication specification associated with the source node indicative of one or more of data transmitted by the source node, a data rate associated with the source node, a data format in accordance with which the source node generates data frames, and contents expected to be included in the data frames.

When result of the coherence analysis (at blocks 410 and 412) indicates that the data frame is valid (i.e., the extracted information is sufficiently coherent with the historical information observed by the receiving node, at block 416), the receiving node updates the historical information based on the data frame including the current data base such that at block 418 the receiving node creates a current view of the environment of the connected car using the updated current database. Otherwise, when the extracted information is not sufficiently coherent with the historical information observed by the receiving node, at blocks 414-1 and 414-2, the receiving node discards the data frame such that the data frame is not processed further.

Figure 4B:
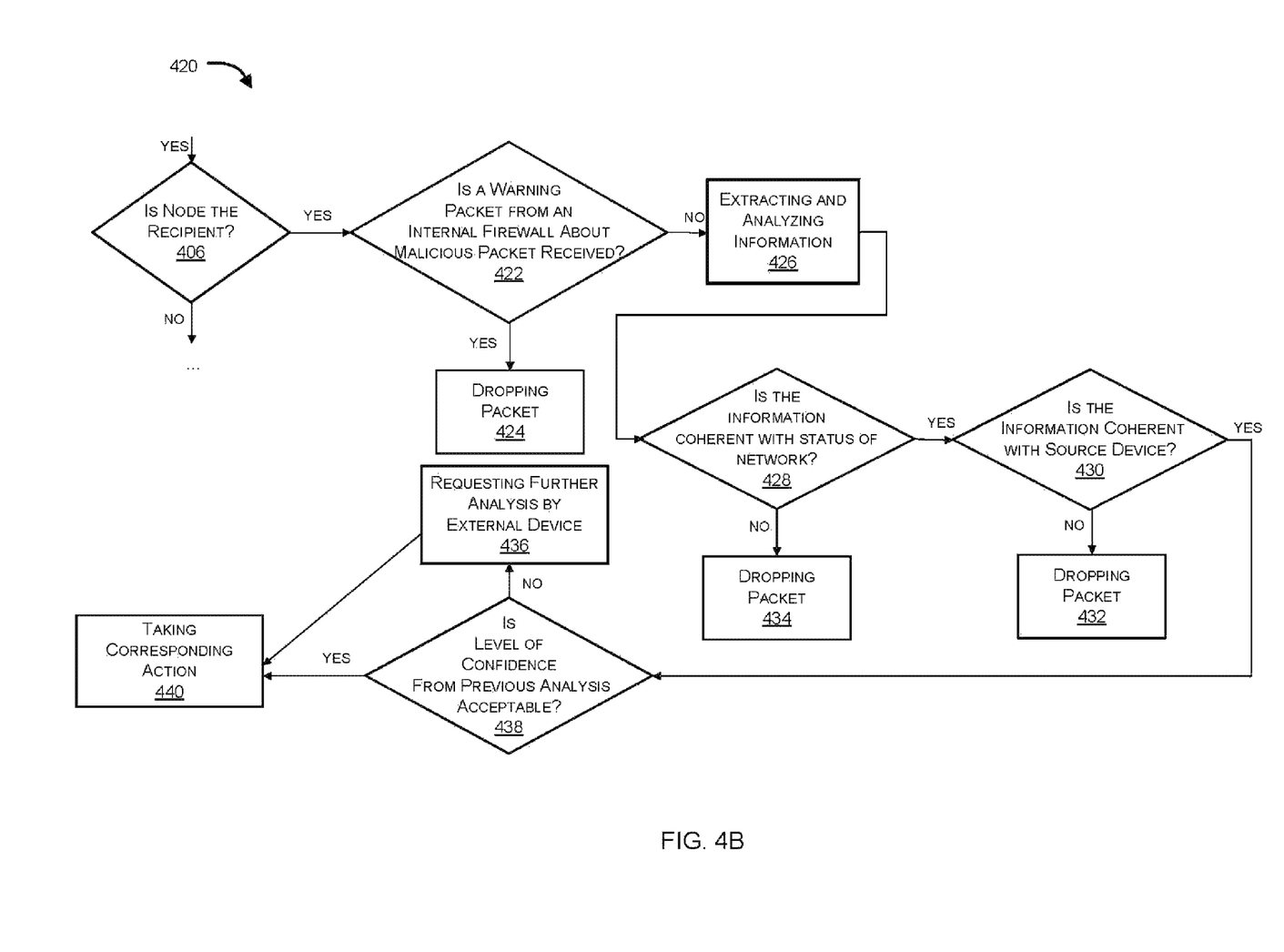
FIG. 4B is a flow diagrams illustrating data frame validation processing implemented by a node that is an intended (interested) recipient of the type of data frame at issue in accordance with an embodiment of the present invention.

FIG. 4B is a flow diagram 420 illustrating data frame validation processing implemented by a node that is an intended (interested) recipient of the data frame at issue in accordance with an embodiment of the present invention.

In context of the present example, subsequent to the receiving node making the first determination at block 406, when the first determination is affirmative (i.e., the receiving node is an intended (interested) recipient of the type of data frame at issue), at block 422, the receiving node makes a second determination regarding whether an internal firewall node has identified the data frame as a potentially malicious data frame. When second determination is affirmative (i.e., when internal firewall 206 has identified the data frame as a potentially malicious data frame), at block 424, the receiving node drops the data frame and discontinues processing of the data frame.

Conversely, when the second determination is negative (i.e., when the internal firewall node has not identified the data frame as a potentially malicious data frame), at block 426 the receiving node extracts information from the data frame and at blocks 428 and 430, the receiving node analyzes coherence between the extracted information and historical information observed by the receiving node in a similar manner as described above with reference to blocks 410 and 412, respectively, such that when a result of the coherence analysis (at blocks 428 and 430) indicates that the data frame is invalid, at blocks 434 and 432, the data frame is dropped and processing of the data frame is discontinued.

Conversely, when result of the coherence analysis (at blocks 428 and 430) indicates that the data frame is valid, at block 438, the receiving node determines a confidence level and compares the confidence level with a confidence threshold such that when the confidence level of the result is greater than or equal to the confidence threshold, at block 440, the receiving node causes the connected car to take an action (e.g., engage electronic parking brake, auto start/stop, activate parking assist, activate/deactivate lane assist/collision avoidance warning, accelerate, decelerate, etc.) based on the data frame. Otherwise, at block 436, the receiving node requests further analysis of the data frame by an external device as analysis by the receiving node is not able to provide the result with sufficient confidence.

Figure 5:
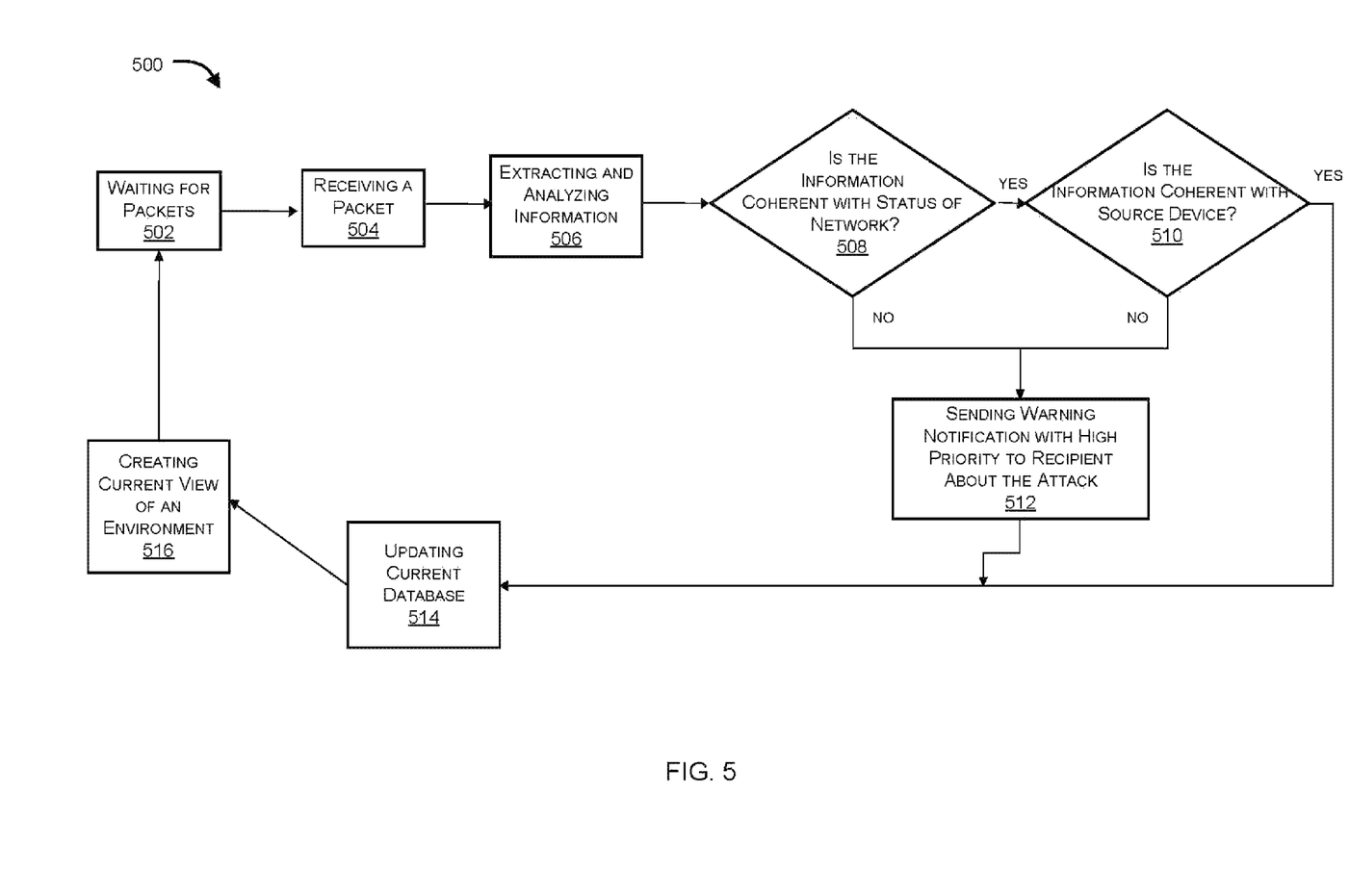
FIG. 5 a flow diagram illustrating a data frame validation process implemented by an internal firewall in accordance with an embodiment of the present invention.

FIG. 5 a flow diagram 500 illustrating a data frame validation process implemented by an internal firewall in accordance with an embodiment of the present invention. In the context of the present example, a security device (e.g., an internal firewall node) is coupled with a CAN bus of a connected car. At block 502, the internal firewall node waits for data frames and at block 504, the internal firewall node receives a data frame broadcast from a source node of the multiple nodes coupled with the connected car. Responsive to receipt of the data frame, at block 506, the internal firewall node extracts information from the data frame and at blocks 508 and 510 the internal firewall node analyzes coherence between the extracted information and historical information observed by the internal firewall node.

In an example, at block 508, the internal firewall node can analyze coherence between the extracted information and current status of an environment in which the connected car is operating based on a current database that can include historical information regarding one or more of neighboring vehicles in proximity to the connected car, a status of a road on which the connected car is driving, and respective status associated with the neighboring vehicles. Further, at block 510, the internal firewall node can analyze coherence between the extracted information and a status of the source node, using a local behavior database that can include historical information regarding a sequence of communications observed by the internal firewall node. The status of the source node can be determined based on any or a combination of the historical information regarding the sequence of communications and a data communication specification associated with the source node indicative of one or more of data transmitted by the source node, a data rate associated with the source node, a data format in accordance with which the source node generates data frames, and contents expected to be included in the data frames.

When a result of the coherence analysis indicates that the data frame is valid, at block 514 the internal firewall updates the historical information based on the data frame and at block 516 the internal firewall node creates a current view of an environment of the connected car. In contrast, when result of the coherence analysis indicates that the data frame is invalid, at block 512, the internal firewall causes all intended recipients of the data frame to drop the data frame by broadcasting a high priority warning notification data frame on the CAN bus. Further, at block 514, the internal firewall updates the historical information based on the data frame and at bock 516 the internal firewall node creates current view of an environment of the connected car.

Figure 6:
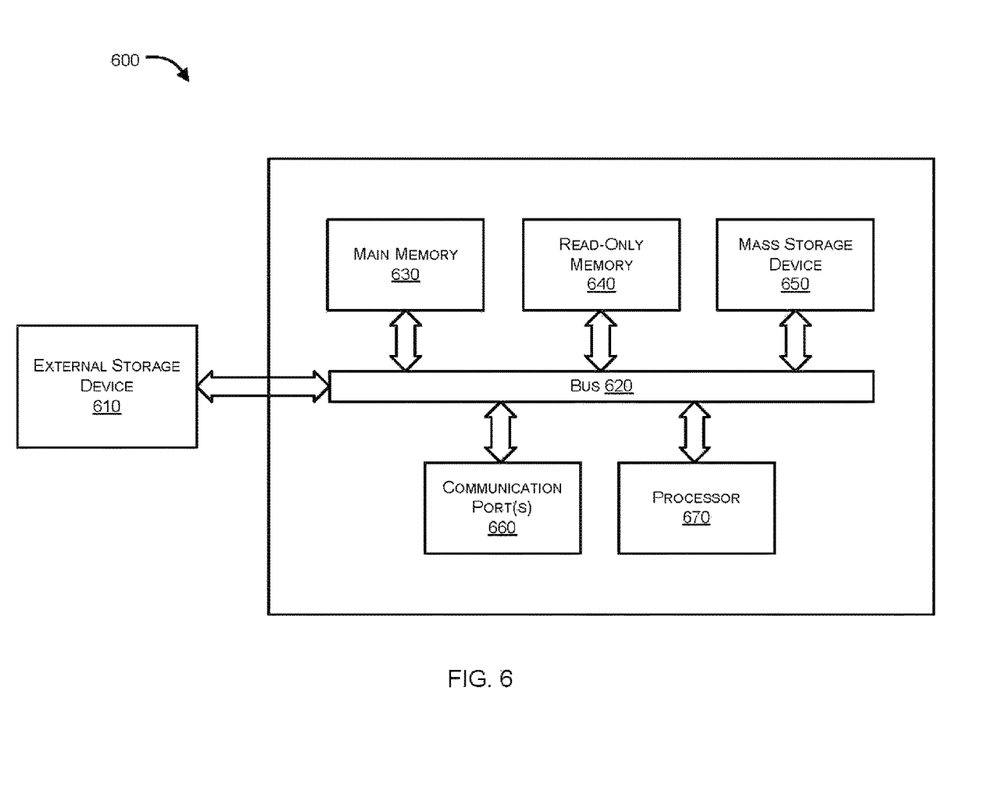
FIG. 6 illustrates an exemplary computer system in which or with which embodiments of the present invention may be utilized.

FIG. 6 illustrates an exemplary computer system 600 in which or with which embodiments of the present invention may be utilized. Computer system 600 may represent some portion of a node (e.g., node 202) or a security device (e.g., internal firewall 206) connected to the CAN bus system of a connected car, for example. As shown in FIG. 6, computer system 600 includes an external storage device 610, a bus 620, a main memory 630, a read only memory 640, a mass storage device 650, a communication port 660, and a processor 670.

Those skilled in the art will appreciate that computer system 600 may include more than one processor 670 and communication ports 660. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention.

Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g. start-up or BIOS instructions for processor 670.

Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A computer-implemented method comprising:
receiving, by one or more processors associated with a receiving node of a plurality of nodes coupled with a Controller Area Network (CAN) bus of a connected car, a data frame broadcast from a source node of the plurality of nodes;
making a first determination, by the one or more processors, whether the receiving node is the intended recipient of the data frame;
responsive to said first determination being affirmative:
making a second determination, by the one or more processors, whether an internal firewall node of the plurality of nodes has identified the data frame as a potentially malicious data frame; and
responsive to said second determination being affirmative, dropping the data frame and discontinuing processing of the data frame;
responsive to said first determination being negative or said second determination being negative, extracting, by the one or more processors, information from the data frame;
analyzing coherence between the extracted information and historical information observed by the receiving node, wherein said analyzing coherence comprises analyzing coherence between the extracted information and a combination of (i) a current status of an environment in which the connected car is operating based on a current database and (ii) a status of the source node, using a local behavior database, wherein the current database includes historical information regarding one or more of (a) an identity of neighboring vehicles in proximity to the connected car, and (b) respective status associated with the neighboring vehicles within a predetermined amount of time, and wherein the local behavior database includes historical information regarding a sequence of communications observed by the receiving node; and
responsive to a result of said analyzing coherence indicating the data frame is valid, updating, by the one or more processors, the historical information based on the data frame, otherwise discarding the data frame.

2. The method of claim 1, wherein the method further comprises when the first determination is affirmative and a confidence level of the result is greater than or equal to a confidence threshold, then causing the connected car to take an action based on the data frame.

3. The method of claim 1, wherein the method further comprises when the first determination is affirmative and a confidence level of the result is less than a confidence threshold, then requesting further analysis of the data frame by an external device.

4. The method of claim 1, wherein the status of the source node is determined based on any or a combination of (1) the historical information regarding the sequence of communications and (ii) a data communication specification associated with the source node indicative of one or more of (a) data transmitted by the source node, (b) a data rate associated with the source node, (c) a data format in accordance with which the source node generates data frames, and (d) contents expected to be included in the data frames.

5. A method comprising:
receiving, by one or more processors associated with an internal firewall node of a plurality of nodes coupled with a Controller Area Network (CAN) bus of a connected car, a data frame broadcast from a source node of the plurality of nodes;
extracting, by the one or more processors, information from the data frame;
analyzing coherence between the extracted information and historical information observed by the internal firewall node; and
responsive to a result of said analyzing coherence indicating the data frame is valid, updating, by the one or more processors, the historical information based on the data frame, wherein said analyzing coherence comprises analyzing coherence between the extracted information and a combination of (i) a current status of an environment in which the connected car is operating based on a current database and (ii) a status of the source node, using a local behavior database, wherein the current database includes historical information regarding one or more of (a) an identify of neighboring vehicles in proximity to the connected car, (b) a status of a road on which the connected car is driving, and (c) respective status associated with the neighboring vehicles within a predetermined amount of time, and wherein the local behavior database includes historical information regarding a sequence of communications observed by the receiving node;
responsive to the result of said analyzing coherence indicating the data frame is invalid, causing one or more intended recipients of the data frame of the plurality of nodes to drop the data frame, by broadcasting a high priority warning notification data frame on the CAN bus.

6. The method of claim 5, wherein said analyzing coherence comprises analyzing coherence between the extracted information and any or a combination of (i) a current status of an environment in which the connected car is operating based on a current database and (ii) a status of the source node, using a local behavior database, wherein the current database includes historical information regarding one or more of (a) neighboring vehicles in proximity to the connected car, (b) a status of a road on which the connected car is driving, and (c) respective status associated with the neighboring vehicles and wherein the local behavior database includes historical information regarding a sequence of communications observed by the internal firewall node.

7. The method of claim 6, wherein the status of the source node is determined based on any or a combination of (i) the historical information regarding the sequence of communications and (ii) a data communication specification associated with the source node indicative of one or more of (a) data transmitted by the source node, (b) a data rate associated with the source node, (c) a data format in accordance with which the source node generates data frames, and (d) contents expected to be included in the data frames.

8. A non-transitory computer-readable storage medium embodying a set of instructions, which when executed by one or more processors of a receiving node of a plurality of nodes coupled with a Controller Area Network (CAN) bus of a connected car, causes the one or more processors to perform a method comprising:
receiving, by the receiving node, a data frame broadcast from a source node of the plurality of nodes;
making a first determination whether the receiving node is the intended recipient of the data frame;

responsive to said first determination being affirmative:
making a second determination whether an internal firewall node of the plurality of nodes has identified the data frame as a potentially malicious data frame; and
responsive to said second determination being affirmative, dropping the data frame and discontinuing processing of the data frame;
responsive to said first determination being negative or said second determination being negative, extracting information from the data frame;
analyzing coherence between the extracted information and historical information observed by the receiving node, wherein said analyzing coherence comprises analyzing coherence between the extracted information and a combination of (i) a current status of an environment in which the connected car is operating based on a current database and (ii) a status of the source node, using a local behavior database, wherein the current database includes historical information regarding one or more of (a) an identify of neighboring vehicles in proximity to the connected car, and (b) respective status associated with the neighboring vehicles within a predetermined amount of time, and wherein the local behavior database includes historical information regarding a sequence of communications observed by the receiving node; and
responsive to a result of said analyzing coherence indicating the data frame is valid, updating the historical information based on the data frame, otherwise discarding the data frame.

9. The non-transitory computer-readable storage medium of claim 8, wherein the method further comprises when the first determination is affirmative and a confidence level of the result is greater than or equal to a confidence threshold, then causing the connected car to take an action based on the data frame.

10. The non-transitory computer-readable storage medium of claim 8, wherein the method further comprises when the first determination is affirmative and a confidence level of the result is less than a confidence threshold, then requesting further analysis of the data frame by an external device.

11. The non-transitory computer-readable storage medium of claim 8, wherein the status of the source node is determined based on any or a combination of (1) the historical information regarding the sequence of communications and (ii) a data communication specification associated with the source node indicative of one or more of (a) data transmitted by the source node, (b) a data rate associated with the source node, (c) a data format in accordance with which the source node generates data frames, and (d) contents expected to be included in the data frames.

12. A non-transitory computer-readable storage medium embodying a set of instructions, which when executed by one or more processors of an internal firewall node of a plurality of nodes coupled with a Controller Area Network (CAN) bus of a connected car, causes the one or more processors to perform a method comprising:
receiving a data frame broadcast from a source node of the plurality of nodes;
extracting information from the data frame;
analyzing coherence between the extracted information and historical information observed by the internal firewall node; and
responsive to a result of said analyzing coherence indicating the data frame is valid, updating, by the one or more processors, the historical information based on the data frame, wherein said analyzing coherence comprises analyzing coherence between the extracted information and a combination of (i) a current status of an environment in which the connected car is operating based on a current database and (ii) a status of the source node, using a local behavior database, wherein the current database includes historical information regarding one or more of (a) an identify of neighboring vehicles in proximity to the connected car, and (b) respective status associated with the neighboring vehicles within a predetermined amount of time, and wherein the local behavior database includes historical information regarding a sequence of communications observed by the receiving node;
responsive to the result of said analyzing coherence indicating the data frame is invalid, causing one or more intended recipients of the data frame of the plurality of nodes to drop the data frame, by broadcasting a high priority warning notification data frame on the CAN bus.

13. The non-transitory computer-readable storage medium of claim 12, wherein said analyzing coherence comprises analyzing coherence between the extracted information and any or a combination of (i) a current status of an environment in which the connected car is operating based on a current database and (ii) a status of the source node, using a local behavior database, wherein the current database includes historical information regarding one or more of (a) neighboring vehicles in proximity to the connected car, (b) a status of a road on which the connected car is driving, and (c) respective status associated with the neighboring vehicles and wherein the local behavior database includes historical information regarding a sequence of communications observed by the internal firewall node.

14. The non-transitory computer-readable storage medium of claim 13, wherein the status of the source node is determined based on any or a combination of (i) the historical information regarding the sequence of communications and (ii) a data communication specification associated with the source node indicative of one or more of (a) data transmitted by the source node, (b) a data rate associated with the source node, (c) a data format in accordance with which the source node generates data frames, and (d) contents expected to be included in the data frames.

* * * * *